United States Patent
Smith et al.

(10) Patent No.: US 12,554,783 B2
(45) Date of Patent: **\*Feb. 17, 2026**

(54) USING DISCOVERED UNIFORM RESOURCE IDENTIFIER INFORMATION TO PERFORM EXPLOITATION TESTING

(71) Applicant: Rapid7, Inc., Boston, MA (US)

(72) Inventors: Adam Smith, Belfast (GB); Ross Kirk, Belfast (GB); Jack Pincombe, Belfast (GB)

(73) Assignee: Rapid7, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/233,339

(22) Filed: Aug. 14, 2023

(65) Prior Publication Data
US 2025/0053601 A1    Feb. 13, 2025

Related U.S. Application Data

(63) Continuation of application No. 17/500,859, filed on Oct. 13, 2021, now Pat. No. 11,768,889.

(51) Int. Cl.
| | | |
|---|---|---|
| G06F 7/02 | (2006.01) | |
| G06F 16/00 | (2019.01) | |
| G06F 16/951 | (2019.01) | |
| G06F 16/9538 | (2019.01) | |
| G06F 16/955 | (2019.01) | |

(52) U.S. Cl.
CPC ........ *G06F 16/951* (2019.01); *G06F 16/9538* (2019.01); *G06F 16/955* (2019.01)

(58) Field of Classification Search
CPC ... G06F 16/951; G06F 16/955; G06F 16/9538
See application file for complete search history.

(56) References Cited

U.S. PATENT DOCUMENTS

| | | | |
|---|---|---|---|
| 6,976,053 B1 | 12/2005 | Tripp et al. | |
| 10,482,073 B2* | 11/2019 | Sun | G06F 16/24578 |
| 11,409,820 B1 | 8/2022 | Gutierrez et al. | |
| 2012/0023230 A1* | 1/2012 | Hosking | H04L 41/12 |
| | | | 709/224 |
| 2016/0112440 A1* | 4/2016 | Kolton | H04L 69/16 |
| | | | 726/1 |
| 2019/0394163 A1 | 12/2019 | Otsubo | |
| 2020/0014697 A1* | 1/2020 | Karin | G06N 20/00 |

* cited by examiner

*Primary Examiner* — Bruce M Moser
(74) *Attorney, Agent, or Firm* — Ashwin Anand

(57) ABSTRACT

A Uniform Resource Identifier (URI) discovery system is implemented that evaluates web configuration servers obtained from web servers to determine the existence and configuration of URIs hosted by the web servers. To discover URIs, the URI discovery system may obtain web server configuration files, and other metadata, from collection agents executing on web servers. The web server configuration files may then be parsed to evaluate the combinations of hosts, paths, and ports for the web server that may correspond to respective URIs. A URI discovery result may then be generated that describes the discovered URIs and includes configurations of the different URIs. The URI discovery result may be stored in an entry for the web server.

20 Claims, 8 Drawing Sheets

USING DISCOVERED UNIFORM RESOURCE IDENTIFIER INFORMATION TO PERFORM EXPLOITATION TESTING

This Application claims priority under 35 U.S.C. § 120 and is a continuation of U.S. patent application Ser. No. 17/500,859 filed Oct. 13, 2021, titled "EVALUATING CONFIGURATION FILES FOR UNIFORM RESOURCE INDICATOR DISCOVERY" the entire contents of which are incorporated herein by reference in its entirety.

BACKGROUND

Web applications are ubiquitous. Various companies or other entities, organizations, and individuals host different applications, systems, or services that are accessible using one (or multiple) Uniform Resource Indicator (URIs). By making features of these different applications, systems, or services accessible using URIs over a public network, such as the Internet, vulnerabilities in the different applications, systems, or services may be exposed. In order to strengthen the design of these different applications, systems, or services, an understanding of the exposed URIs may be beneficial. For example, identifying which URIs are exposed and how they are exposed may allow operators of the different applications, systems, or services to make design improvements that protect against malicious behavior or other attacks against the exposed URIs.

As different applications, systems, or services grow and develop over time, a complete understanding of exposed URIs may not be maintained. For example, different configuration changes, development projects, or other operations that change the implementation of different applications, systems, or services, can cause some exposed URIs to become lost. Thus, techniques for discovering exposed URIs may support the development of different applications, systems, or services over time by discovering these lost URIs.

SUMMARY OF EMBODIMENTS

The systems and methods described herein may be employed in various combinations and in embodiments to implement a Uniform Resource Identifier (URI) discovery system that evaluates web configuration servers obtained from web servers to determine the existence and configuration of URIs hosted by the web servers. To discover URIs, the URI discovery system may obtain web server configuration files, and other metadata, from collection agents executing on web servers. The web server configuration files may then be parsed to evaluate the combinations of hosts, paths, and ports for the web server that may correspond to respective URIs. A URI discovery result may then be generated that describes the discovered URIs and includes configurations of the different URIs. The URI discovery result may be stored in an entry for the web server. In some embodiments, notifications of the URI discovery result may be sent. In some embodiments, queries to obtain the URI discovery result may be supported.

Figure 1:
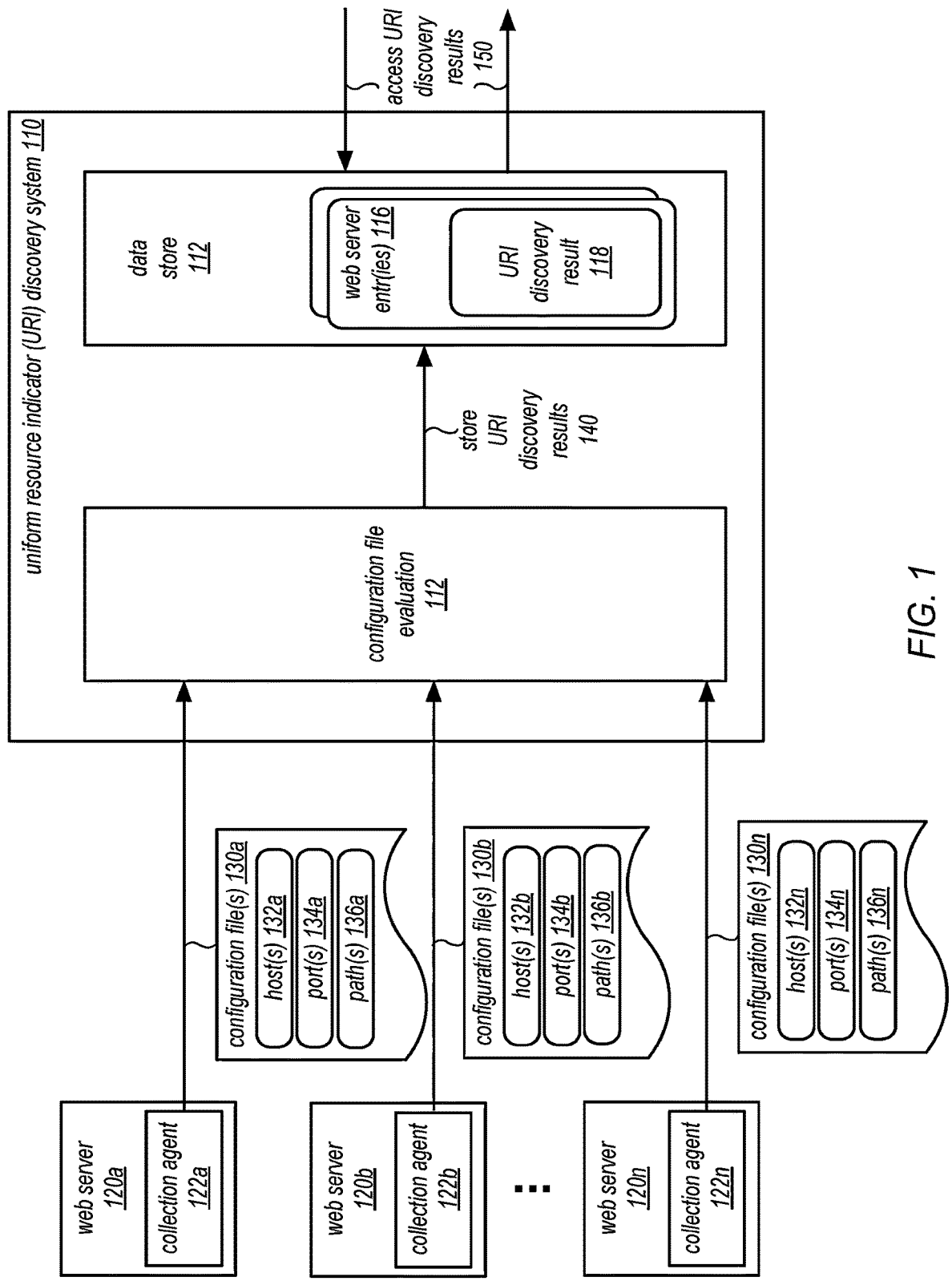
FIG. 1 is a block diagram illustrating a Uniform Resource Indicator (URI) discovery system that evaluates configuration files for URI discovery, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various techniques of evaluating configuration files for Uniform Resource Indicator (URI) discovery are described herein. Various different systems, services, or applications utilize URIs to access resources for invoking, interacting, with or otherwise utilizing system, service, or application features. Different types of URIs may be implemented, such as Uniform Resource Locators (URLs) which may provide a path or location of a resource (e.g., a web page or feature of an application, system or service exposed or invoked at the location). In some embodiments, another type of URI may be a Uniform Resource Name (URN), which may provide a unique name for retrieving or identifying a resource. Because URIs are accessible to other systems, services, or applications that act as clients, visibility into exposure of a hosted URI may provide an indication of the vulnerabilities in various web applications, systems, or services. For example, such vulnerabilities may include both specific, "known" vulnerabilities (e.g. a specific Common Vulnerabilities and Exposures (CVE) identifier as it applies to a software product or platform) as well as more general weaknesses, such as Structured Query Language (SQL) injections and cross-site scripting, among others. To gain visibility of URIs (e.g., within a network), web server configuration files can be obtained from web services (e.g., by collection agents as discussed below) and analyzed to discover hosted URIs on web servers, which may include servers and URIs that a user, operator, or other entity that is responsible for the web server is unaware of.

While some solutions for analyzing various machines (e.g., various computing resources, systems, or devices as discussed in detail below with regard to FIG. 2) may search for vulnerabilities, such techniques may rely upon a known set of URIs to be scanned by spidering from the known set of URIs. Spidering uses known starting URIs and recursively follows any embedded links in the page content to attempt to discover all URIs being hosted. However, this approach may not be able to discover some URIs. For example, some URIs may not be linked to another known URI. In such a scenario, this unlinked URI would not be found by spidering techniques. In various embodiments, techniques for evaluating configuration files for Uniform Resource Indicator (URI) discovery can locate unknown and unlinked URIs, improving the performance of URI discovery and vulnerability analysis applications over, for example, those techniques such as spidering that rely upon known URIs in order to search. Instead, evaluating server configuration files can provide up-to-date information on the evaluated web servers in their environment along with any URIs the web servers are hosting (including previously unknown and unlinked URIs) which can then be given as input to other tools for further analysis.

FIG. 1 is a block diagram illustrating a Uniform Resource Indicator (URI) discovery system that evaluates configuration files for URI discovery, according to some embodiments. Uniform resource indicator (URI) discovery system 110 may be a standalone system, application, tool, or service that may evaluate configuration files collected from different web servers in order to generate URI discovery results, in some embodiments. As discussed in detail below with regard to FIG. 2, URI discovery system 110 may be a feature of a larger application, system, or service, such as machine monitoring service 230.

URI discovery system 110 may communicate with different web servers, such as web servers 120a, 120b, and 120n. Web servers 120 may be implemented across a variety of different computing resources, including, but not limited to workstations, servers, mobile devices, virtual machines, or any other computing system or device, such as computer system 1000 described below with regard to FIG. 8, which may implement a web server. In various embodiments web servers, such as web servers 120 may support various network protocols or requests (e.g., requests using Hypertext Transfer Protocol (HTTP) or Hypertext Transfer Protocol Secure (HTTPs)) which are used to distribute or otherwise provide web pages. For example, a web page may be defined using Hypertext Markup Language (HTML) and utilize various other scripts, code, or interactive features that may act as an interface to other web pages or application functionality provided by the web server 120 or a different web server 120. These web pages may be accessed by or include links to different URIs. For example, as noted earlier, a URI may be specified as a URL, which may provide a network path or location for accessing a web page (or other feature hosted at the web server), or as a URN, which may provide a unique identifier for a resource.

Web servers 120 may be implemented according to web server configuration files. These configuration files may include various parameters, properties, and values which may be used to configure the web server, including any paths and ports corresponding to different resources being hosted by the web server. Web server configuration files may be stored in different locations on a host computing resource for a web server 120. For example, some embodiments of a web server 120 may utilize a single configuration file structure to configure the web server, such as MICROSOFT INTERNET INFORMATION SERVICES (IIS), which may store a single configuration file at "%WinDir%\System32\Inetsrv\Config". Other configuration files may utilize a multi-configuration file structure, utilizing multiple different configuration files (e.g. the APACHE servers discussed in detail below).

In various embodiments, web servers 120 may implement respective collection agents, such as collection agents 122a, 122b, and 122n, to locate and provide configuration file(s) 130a, 130b, and 130n. As noted above, these configuration files 130 may be stored in known locations, which collection agents 122 may access in order to obtain the configuration files 130. In some embodiments, collection agents 122 may scan or otherwise search for configuration files 130 (e.g., searching directory or other file structures), as discussed in detail below with regard to FIG. 3.

URI discovery system 110 may implement configuration file evaluation 112, which may receive the configuration files 130 for the different web servers 120. Configuration file evaluation 112 may perform various techniques for evaluating configuration files 130, including analyzing the respective host(s), port(s), and path(s), such as host(s) 132a, 132b, and 132n, port(s) 134a, 134b, and 134n, and path(s) 136a, 136b, and 136n. Configuration file evaluation 112 may evaluate the combinations of host(s) 132, port(s) 134 and path(s) 136 in a configuration file 130 in order to discover the different URIs (which may be specified as a combination of host, port and path) hosted by web servers 120. For example, host(s) 132 may be the hostname (e.g., "example.com") or network address (e.g., an Internet Protocol (IP) address 172.20.30.40") that accesses a resource at web servers 120. Port(s) 132 may be a communication endpoint managed by a host of the web server 120 that is associated with a process or service. Paths 136 may be the location of a resource (e.g., specified as a file directory location specified according to various different conventions, such as "example.com/index.html" or "example.org/index.html"). In some embodiments, a path 136 may be empty for a URI.

Different web server 120 implementations may use different combinations of one or more configuration file(s) 130. Therefore, configuration file evaluation 112 may select or implement different workflows for handling different types of configuration files 130, as discussed in detail below with regard to FIGS. 4 and 6. Configuration file evaluation 112 may analyze the received configuration file(s) 130 and determine which URIs are hosted by a web server 120 and store 140 corresponding URI discovery results 118 in data store 112. As discussed in detail with regard to FIGS. 4 and 6, these URI discovery results 118 may be stored in respective web server entr(ies) 116.

Figure 5:
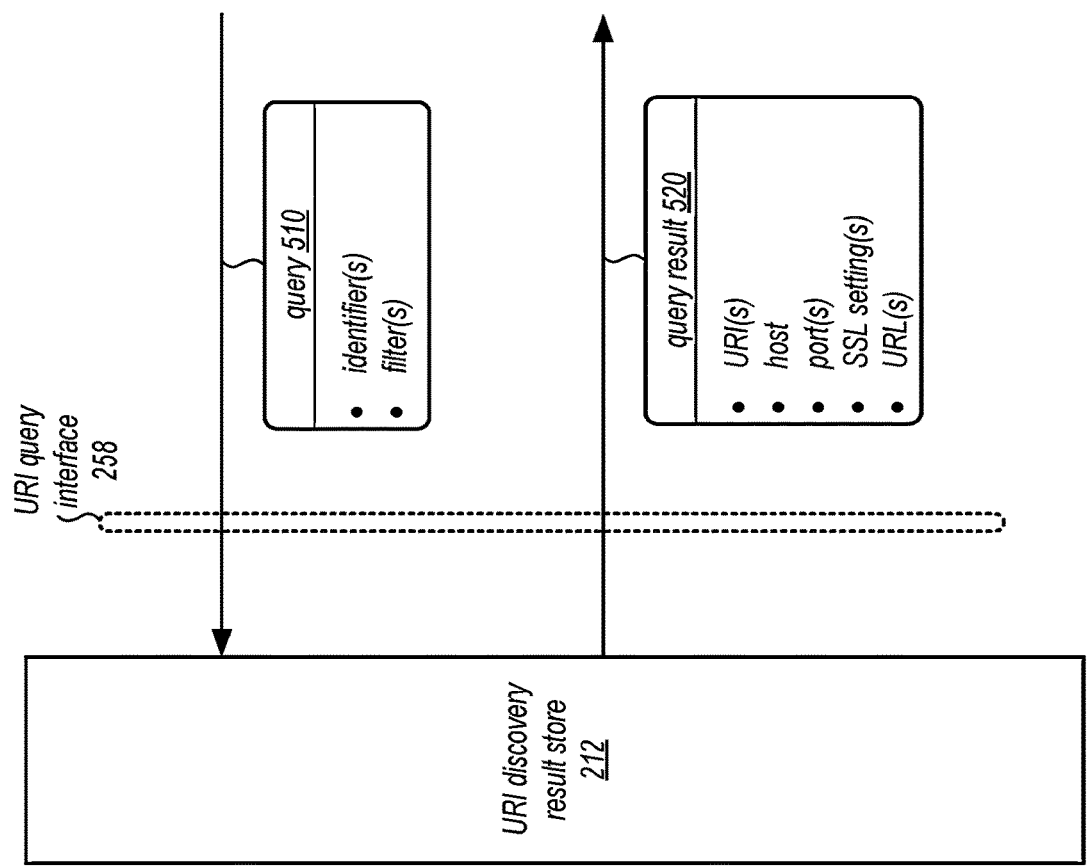
FIG. 5 is a block diagram illustrating a query interface for a URI discovery result store, according to some embodiments.
Figure 7:
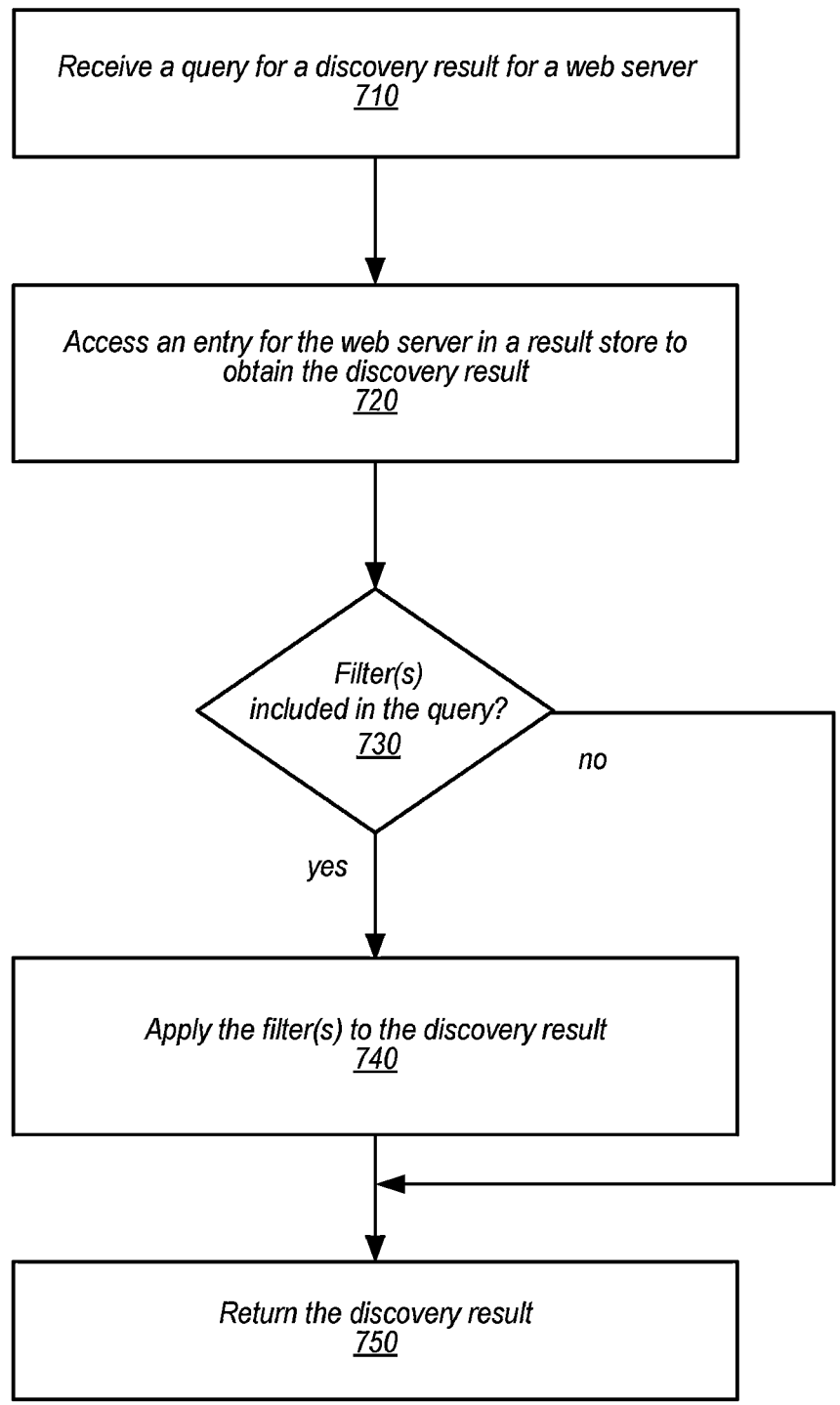
FIG. 7 is a flowchart illustrating a method for querying for URI discovery results, according to some embodiments.

Data store 112 may be various types of data store (e.g., different types of databases) which can support different requests to access URI discovery results, as discussed in detail below with regard to FIGS. 5 and 7. For example different types of queries can be received for particular web servers, and in response the URI discovery results 118 for the particular web server can be retrieved from the corresponding web server entry 116 and returned in response.

Please note that previous descriptions of a web server, collection agent, and URI discovery system are not intended to be limiting, but are merely provided as example embodiments. As discussed below, various different computing systems or devices may implement techniques for evaluating configuration files for URI discovery.

This specification continues with a general description of a machine monitoring service that may implement evaluating configuration files for URI discovery. Then various examples of the machine monitoring service are discussed, including different components/modules, or arrangements of components/module, that may be employed as part of implementing the machine monitoring service, in some embodiments. A number of different methods and techniques to implement evaluating configuration files for URI discovery are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
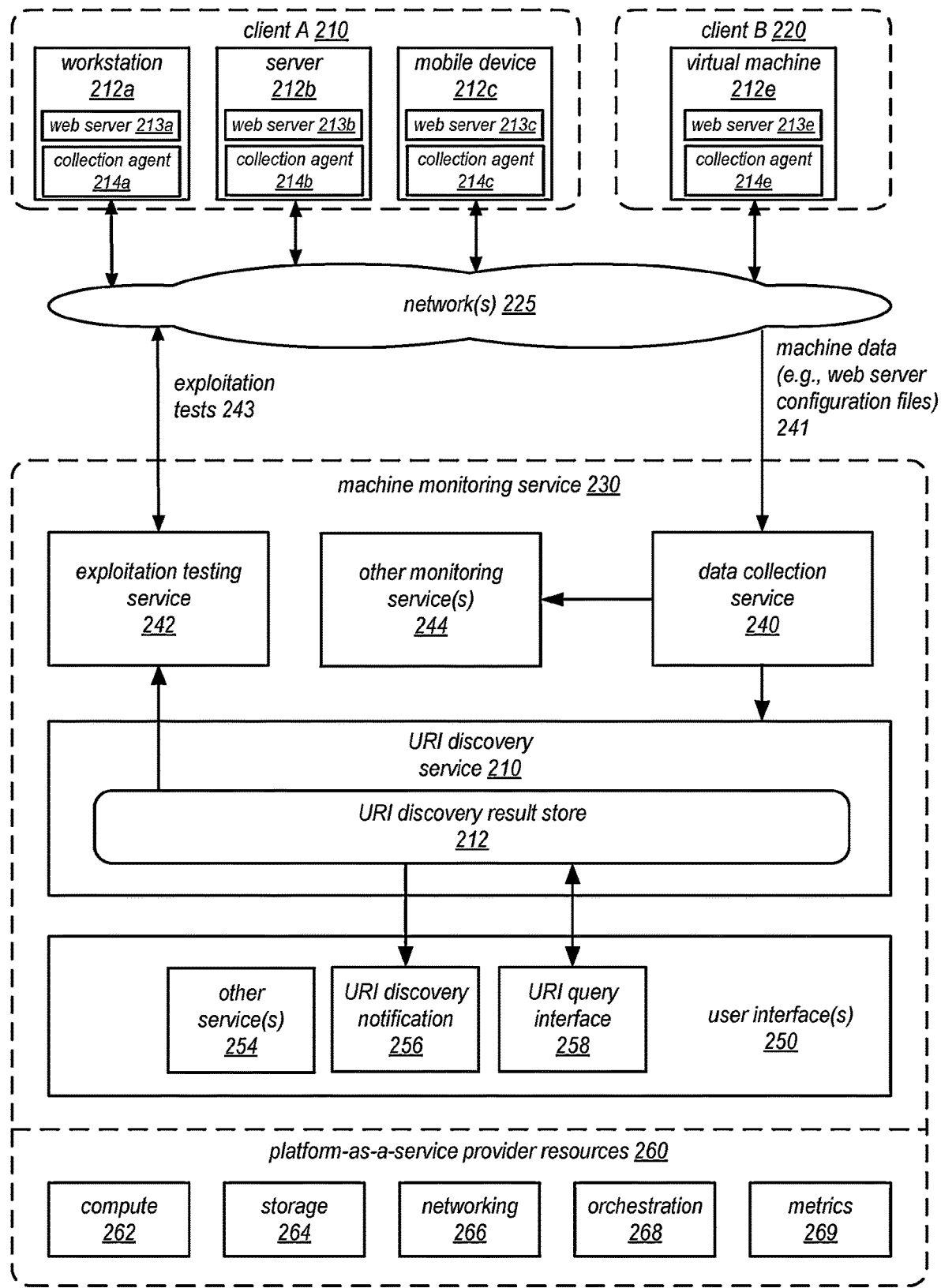
FIG. 2 is a block diagram illustrating a machine monitoring service implemented by a platform-as-a-service provider network that implements a URI discovery service that evaluates configuration files for URI discovery, according to some embodiments.

FIG. 2 is a block diagram illustrating a machine monitoring service implemented by a platform-as-a-service provider network that implements a URI discovery service that evaluates configuration files for URI discovery, according to some embodiments.

As shown in the figure, a machine monitoring service 230 is implemented using a platform-as-a-service (PaaS) provider network. The machine monitoring service 230 may be operated by a provider company to provide a number of cloud-based client-facing services 240, 242, 244, and 210 to various clients. The client networks 210 and 220 may be operated by different groups, organizations, companies, or other types of entities that are customers of the machine monitoring service 230. In some embodiments, different clients may be associated with different user accounts of the machine monitoring service 230.

In various embodiments, the network(s) 225 may encompass any suitable combination of networking hardware and protocols necessary to establish communications between the client networks 210 and 220 and the machine monitoring service 230. In some embodiments, the machines 212 may execute in a private network of a company, behind a company firewall, and the network 225 may include a public network such as the Internet, which lies outside the firewall. The network 225 may encompass the different telecommunications networks and service providers that collectively implement the Internet. In some embodiments, the network 225 may also include private networks such as private local area networks (LANs), private wide area networks (WANs), or private wireless networks. The network 225 may be implemented using different hardware (e.g., modems, routers, switches, load balancers, proxy servers, etc.) and software (e.g., protocol stacks, accounting software, firewall/security software, etc.) for establishing networking links between the client networks 210 and 220 and the machine monitoring service 230.

As shown, the client networks 210 and 220 may include different types of computing resources, such as a workstation 212a, a server 212b, a mobile device 212c, and a virtual machine 212e. Each of these types of machines may implement a web server (e.g., web servers 213a, 213b, 213c, and 213e), which may be similar to web servers 120 as discussed above with regard to FIG. 1. Likewise, each of these types of machine may implement a collection agent (e.g., collection agents 214a, 214b, 214c, and 214e) which may be similar to collection agents 122 discussed above). The virtual machine 112e is an instance of an emulated computer or execution environment that is hosted on a physical virtual machine host. The virtual machine host may implement virtualization hardware and/or software (e.g. hypervisors) to execute and manage multiple instances of guest operating systems. Example implementations of such virtualization technologies include VMWARE ESX/ESXI, MICROSOFT HYPERV, AMAZON WEB SERVICES, and MICROSOFT AZURE. Another type of virtual machine is the container, which provides a portable and isolated execution environment over a host operating system of a physical host. Example implementations of container technologies include DOCKER, GOOGLE KUBERNETES, AMAZON WEB SERVICES, and MICROSOFT AZURE. As may be appreciated, the machines 212 may include a variety of other types of computing systems, including embedded systems, networking devices, storage devices, Internet-of-Things (IoT) devices, vehicles, and the like.

As shown, the machine monitoring service 230 may implement a data collection service 240, which implements the data collection component 122 of FIG. 1. In some embodiments, the data collection service 240 may be configured to collect specified machine characteristics data 241 about the assets operated by a large number of clients, including information such as web server configuration files collected for performing URI discovery. The collections may be performed using different means, such as collection agents 214 on the machines 212, specialized data collection appliances located in the client private networks 210 and 220, or network scanners operated as part of the machine monitoring service 230. In some embodiments, the data collections may be controlled via configuration information specified by the administrators of the clients. The collections may occur periodically according to a set schedule, or based on certain specified events (e.g. in response to changes in the client network or a request from the data collection service 240). In some embodiments, the collected data 241 may be used to maintain an up-to-date virtual representation of the machines or entire client networks, which is used by the machine monitoring service 230 to perform a variety of assessments of client assets, including URI discovery service 210.

URI discovery service 210 may be similar to URI discovery system 110 discussed in detail above with regard to FIG. 1. As discussed in detail below with regard to FIGS. 3-5, URI discovery service 210 may evaluate web server configuration files and other collected machine data 241 to discover URIs hosted by web servers 213. Results of these discoveries may be stored in URI discovery result store 212 which may be accessible to other services, such as exploitation testing service 242, as well as utilized to support various user interfaces 250, including URI discovery notification 256 and URI query interface 258. For example, URI discovery notification 256 may be a messaging system utilizing various electronic communication systems and protocols (e.g., posting notifications to user dashboards or other user interface elements, sending email or other messages to different recipients, etc.) to provide a notification to one or more recipients that a new URI result has been generated. Lookup information, such as an organization ID and server ID, that can be used to obtain the discovery result (e.g., using URI query interface 258). As discussed in detail below with regard to FIG. 5, queries may be submitted and served from URI discovery result store 212.

As shown, the machine monitoring service 230 may implement an exploitation testing service 242. In some embodiments, the exploitation testing service may be implemented using a penetration testing framework that provides penetration test modules to simulate known types of cyber-attacks. Such penetration testing frameworks may include penetration testing platforms such as METASPLOIT, NMAP, NETSPARKER, NESSUS, and WIRESHARK, among others. In some embodiments, certain exploitation tests may be performed in an automated fashion, for example, periodically or on an event-driven basis. For example, some clients may require that exploitation tests be performed when new URIs are discoverable and stored in URI discovery result store. In some embodiments, new exploitation tests are performed on assets when new cyberattacks are discovered and an exploitation test module for the attack becomes available. In some embodiments, exploitation tests may be performed in a pseudo-random fashion on assets of different clients.

In some embodiments, the results obtained by the data collection service 240 and exploitation testing service 242 may be added to a machine demographic data repository, which stores anonymized demographic data about a wide variety of machines and client networks. Such demographic data may indicate the things such as the prevalence of certain machine characteristics (e.g. types of operating systems, applications, etc.) in the population of machines, and also the incidences or prevalence of different types of cyberattacks.

As shown, the machine monitoring service 230 may implement various other monitoring services, such as for various malicious behavior (e.g., network-based attacks), failures, or other error scenarios at machines 212. Such other monitoring services 244 may utilize machine data 241 collected by data collection service 240 to implement various monitoring tasks. Similar to interfaces 256 and 258, these other monitoring service(s) 244 may be managed, accessed, or otherwise utilize other service(s) interface 254 to communicate various information related to other monitoring services 244 operations.

As shown, the machine monitoring service 230 may also implement a user interface 250, which provides the interfaces 254, 256, and 258, as discussed. The user interface 250 may be a web-based interface that is accessible via a web browser. The user interface 250 may be a graphical or command line user interface. In some embodiments, the user interface 250 may also include real-time notification interfaces such as email or text interfaces. In some embodiments, the user interface 250 may be implemented as part of a user console to allow users to configure various aspects of the machine monitoring service 230, receive assessments reports, and carry out remediation actions. In some embodiments, the user interface 250 will allow users to specify how URI discovery service 210 should operate, such as the frequency and/or conditions under which URI discovery evaluations should be initiated or updated.

As a whole, the machine monitoring service 230 may be implemented as a number of web services that receive web services requests formatted as JSON documents. The machine monitoring service 230 may support REST-style or document-based (e.g., SOAP-based) types of web services requests. In some embodiments, the machine monitoring service 230 may implement service interfaces using other types of remote procedure calling protocols, such as GOOGLE PROTOCOL BUFFERS or PROTOBUF. The PaaS provider network may provide hardware and/or software to implement service endpoints, such that a request directed to that endpoint is properly received and processed.

As shown, the PaaS provider network may provide different types of computing resources 260 for the machine monitoring service 230, which can be leased by the operator of the machine monitoring service 230. The PaaS provider may provide resource services such as compute resource service 262, storage resource service 264, networking resources service 266, orchestration service 268, and resource metrics service 269. The services of the machine monitoring service 230 may be built using these underlying resource services provided by the PaaS provider. In some embodiments, the PaaS resources 260 may implement features such as load balancing of incoming service requests and/or dynamic management and scaling of service node pools. In some embodiments, each of the services 240, 242, 244, and 210 may be implemented using a pool of service nodes provided by the PaaS provider, which may be individual instances of virtual machines. In some embodiments, the PaaS provider may be a provider such as AMAZON WEB SERVICES or MICROSOFT AZURE.

Figure 3:
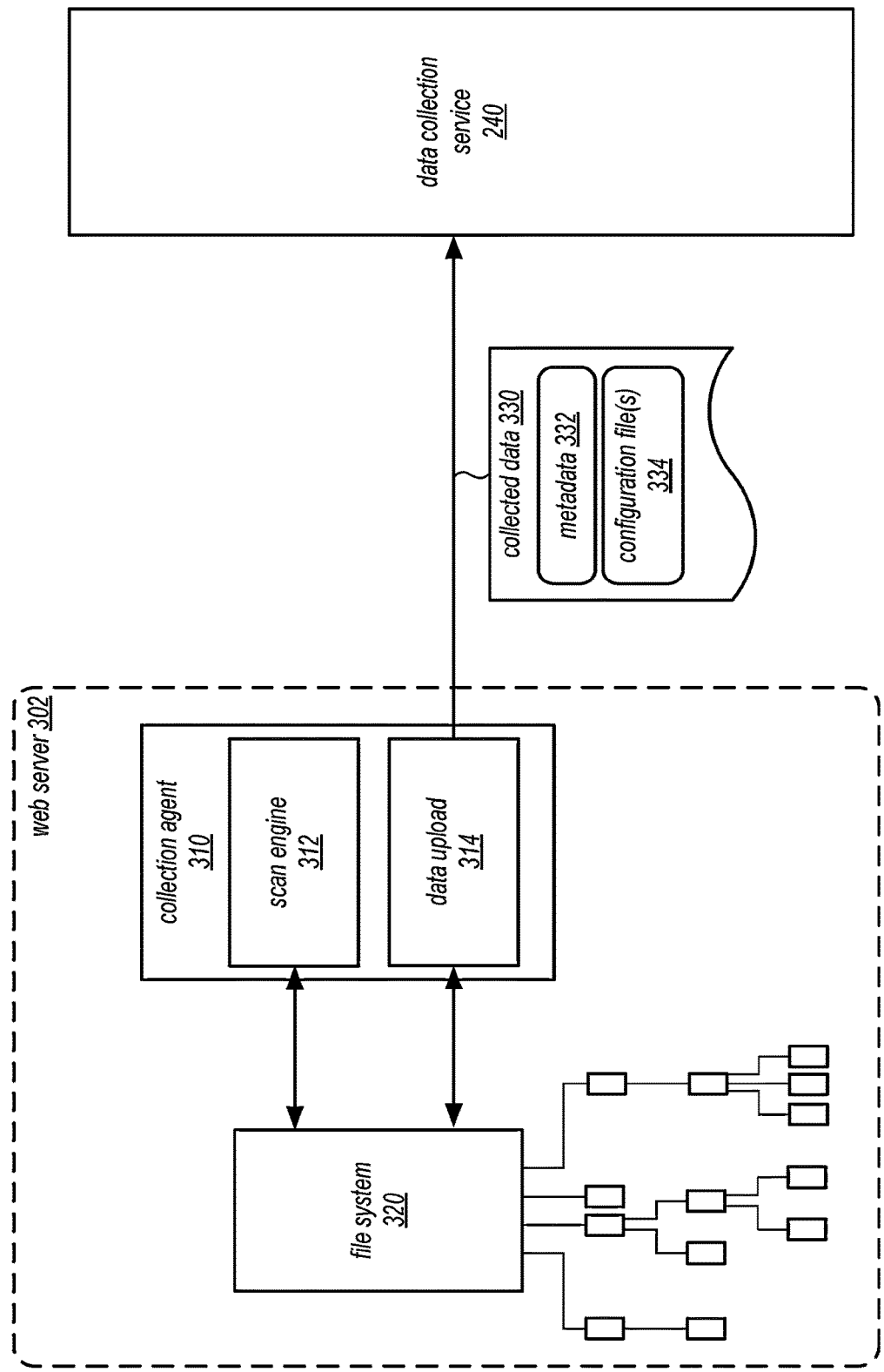
FIG. 3 is a block diagram illustrating interactions between a collection agent at a web server and a machine monitoring service, according to some embodiments.

As discussed above, data may be collected from a web server, including web server configuration files that may be used to discover URIs hosted by the web server. FIG. 3 is a block diagram illustrating interactions between collection agent at a web server and a machine monitoring service, according to some embodiments. Web server 302 (which may be similar to web servers 213 in FIGS. 2 and 120 in FIG. 1) may implement a collection agent 310 (similar to collection agents 214 in FIGS. 2 and 122 in FIG. 1). In some embodiments, collection agent 310 may implement scan engine 312 to locate, among other machine data, one or more configuration file(s) 334 for web server 302 by performing a scan of file system 320. Scan engine 312 may periodically scan file system for configuration file(s) 334 (e.g., according to a time interval), in some embodiments. In some embodiments, scan engine 312 may perform a scan responsive to detected events (e.g., update events for web server 302 that could be an update to configuration file(s) 334). In some embodiments, scan engine 312 may search pre-defined locations, such as known or common location for configuration files, such as "%WinDir%\System32\Inetsrv\Config." In some embodiments, a wider scan (up to scanning the entirety of file system 320) may be performed to locate configuration file(s) 334. In some embodiments, multiple configuration file(s) 334 may be used, which may be indicated by a single configuration file (e.g., a "main" configuration file) may be read and used to locate or determine the existence of other configuration files. For example, for an APACHE web server, configuration can be spread across multiple files, with the main configuration file referencing some number n additional files.

In some embodiments, scan engine 312 may execute various commands on a host system for web server 302 to obtain various information, which may be included as part of metadata 332. For example, commands can be executed to determine which ports, if any, are being listened to. Which commands are executed and whether the commands executed successfully may be included in metadata 332 as command execution results. For example, to get module (configuration file information), a command "apacheModuleInfo" may be executed using a command string "apache2ctl-M". A result of the command may be determined and stored as well as an output file location (e.g., "apache2ctlM.txt"). Such information may be included in metadata 332. Scan engine 312 may also collect various other information to include in metadata 332 about the configuration file(s) 334, such as type of web server 302 (e.g., vendor of the web server, product name of the web server, location of configuration file(s) 334 (including a location of a main configuration file), filename(s) of configuration file(s) 334, whether one or multiple configuration files are used, among others.

Data upload 314 may, in various embodiments, be implemented to read, copy, or otherwise capture located configuration file(s) 334 for upload to data collection service 240. For example, data upload 314 may utilize an application programming interface (API) for a storage location associated with data collection service 240 in order to send or put collected data 330, including configuration file(s) 334 and metadata 332. In some embodiments, the storage location in data collection service may be determined based on information associated with web server 302. For example, a machine or asset identifier, and an entity, account, or organization identifier may be used by data upload 314 to determine a storage location for the configuration file. In some embodiments, data upload 314 may determine whether or not collected information, such as configuration file 334 or metadata 332 includes changes over a previously sent version. In such scenarios, data upload 314 may only send changed values or other information indicating the deltas to collected data 330.

Figure 4:
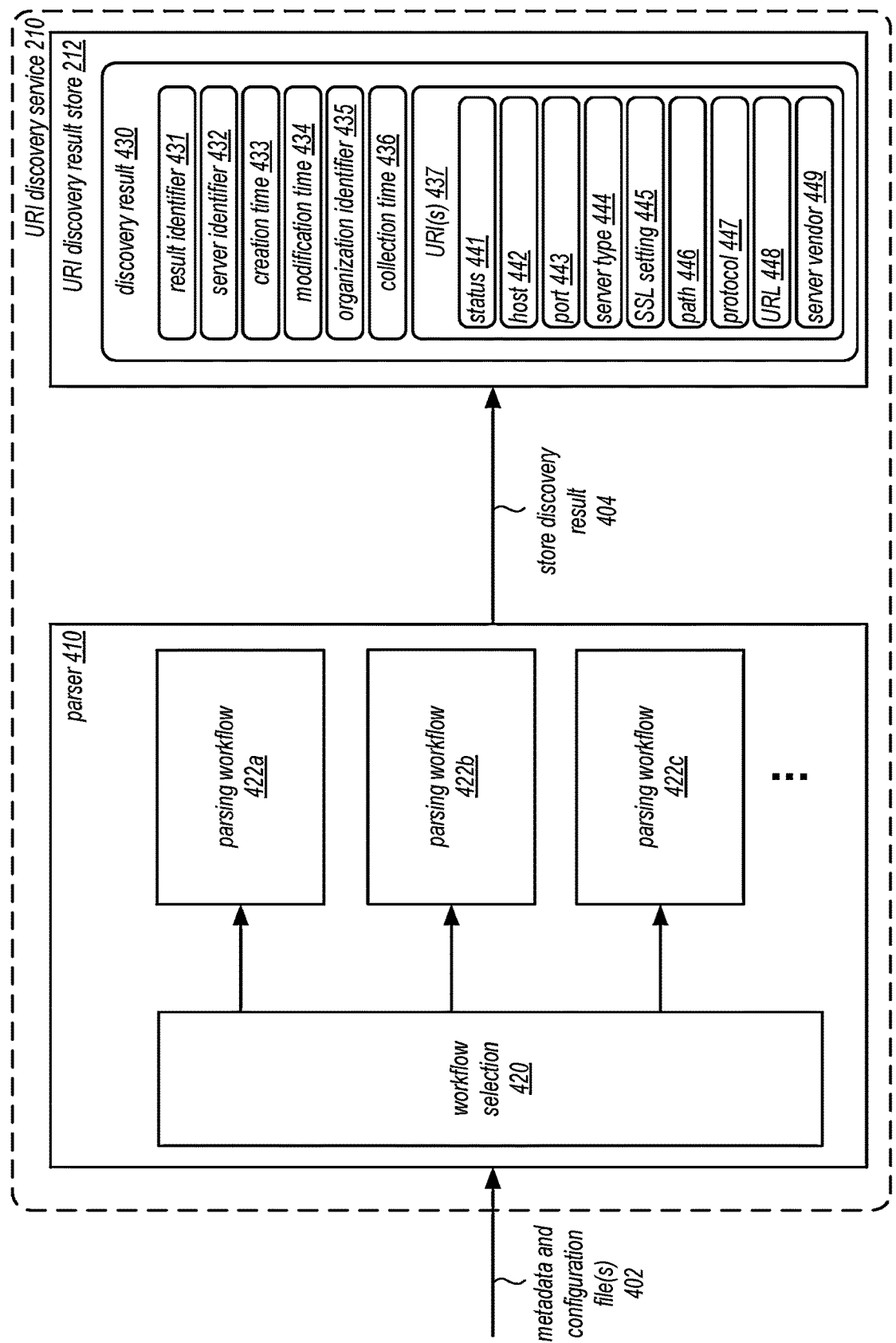
FIG. 4 is a block diagram illustrating a parser and a URI discovery result store of a URI discovery service, according to some embodiments.

Once collected data 330 is provided to data collection service 240, URI discovery service 210 may evaluate the collected data 330 to discover and generate URI results. FIG. 4 is a block diagram illustrating a parser and a URI discovery result store of a URI discovery service 210, according to some embodiments. As illustrated in FIG. 4, URI discovery service 210 may implement parser 410 to evaluate collected data, such as metadata and configuration file(s) 402 (which may be similar to metadata 332 and configuration file(s) 334 discussed above with regard to FIG. 30. Parser 410 may be implemented to evaluate different types of web servers and thus may implement workflow selection 420, which may utilize a different workflow (or portion of a workflow) to generate discovery results 404. For example, parser 410 may implement different parsing workflows, 422a, 422b, and 422c, which may correspond to different vendors or products. Workflow selection 420 may, in various embodiments, utilize metadata to determine which parsing workflow to utilize (e.g., an APACHE workflow for APACHE servers, a MICROSOFT IIS workflow for MICROSOFT IIS servers).

As different configuration file(s) may be used for different types of web servers, parsing workflows 422 may include different operations to evaluate and generate discovery results. For example, a parsing workflow for MICROSOFT IIS may evaluate a single configuration file, which may be written in Javascript Object Notation (JSON), using a deserialization library, such as a JSON deserialization library.

In some embodiments, a parsing workflow 422 may evaluate multiple configuration files. For example, for an APACHE web server, the configuration can be spread across multiple configuration files, with a main configuration file referencing n number of additional files. The main configuration may declare variables which can be referenced later and may contain sections that are considered active depending on another configuration (e.g., if an APACHE module is currently loaded). Moreover, in such an example, a line in a configuration file may be split over multiple physical lines in the configuration file, with a character, such as the backslash (\) character used to indicate a continuation of the line. In view of the following characteristics, a parsing workflow 422 may implement techniques similar to the following pseudocode:

open main configuration file for reading
for each line in config:
  if line ends with "\"
    store content in variable and restart loop
  check if current line references a variable,
    if so look up definition map and
      inject value in part of variable
  check if the current line should be skipped,
    e.g., if currently inside an if condition
      for a module which isn't currently loaded (check skip module stack)
  check if the current line is the end for the current
    if module condition, if so, pop the module off the skip module stack
  check if line matches a comment,
    if so skip line and continue
  check if line matches an include statement,
    if so recursively call this function again passing in the file path of the included config file
  check if line is a variable declaration,
    if so update definition map with variable name and value so it may be referenced later
  check if line is a load module declaration,
    if so update list of loaded modules
  check if line is an if conditional based on a loaded module,
    if so check if the module is not loaded,
    if not, add module to skip module stack
  check if line is an if not conditional based on a loaded module,
    if so check if module is loaded,
    if so, add module to skip module stack For checking if a line matches a particular directive, regular expression searches (e.g., regex statements with capture groups) may be utilized. This allows checking for a match and extracting any values all in one step, and the regex statements can be used to provide case insensitivity and handle any number of additional whitespace values between directive and value(s).

The interpretation of configuration files by parsing workflows 422 may evaluate the configuration information for configured sites and configured virtual hosts. For example, both APACHE and MICROSOFT IIS support the hosting of multiple URIs on the same web server. MICROSOFT IIS uses the concept of multiple "sites" and APACHE refers to "virtual hosts." In both cases, the configuration for each, generally allows configuration default values which will apply to each URI, unless the URI explicitly overrides any values.

Consider the following example, taking APACHE as an example the process of discovering URIs is as follows. Parsing workflow 422 may determine listening ports for a default configuration along with any default paths. Parsing workflow 422 may determine listening addresses/ports and paths specific to any virtual host. If the address uses a wildcard * or _default, it will serve all requests for that port, otherwise it may only be responsible for requests to a certain address and the base configuration handles the rest. For both the base configuration and every virtual host, parsing workflow 422 may determine the path/port combinations a web server is responsible for, taking into account whether Secure Sockets Layer (SSL) is enabled. For values not specifically specified in a virtual host, parsing workflow 422 may fall back to the base configuration values.

The example techniques discussed above may be applied to an example configuration of an APACHE server. The APACHE server may have a base configuration, with a hostname "example.org" that listens on ports 80 and 81. The example configuration may also use two virtual hosts, host 1 and host 2. For host 1, a network address of "172.20.30.40" listening to port "81" may be used, with SSL enabled and a hostname of "example.com." For host 2, a network address of "*", a wild card, listening to port "80" and a hostname of "example.co.uk". Thus, the example configuration may use both name-based and IP-based virtual hosting. When requests are received by the example APACHE server, the address/port would be examined. Any requests specifically for address 172.20.30.40:81 would go to virtual host 1, any other request to port 81, would fall through to the base configuration, whereas the wildcard address for virtual host 2 means it would receive all requests on port 80. Therefore when determining the URIs, the above technique would discover a URI for "example.org: 81" that would be valid but "example.org: 80" would not be valid as virtual host 2 would consume every request on that port.

The evaluation techniques applied by parsing workflows 422 may determine a web server that has been configured but is not currently running. The output of commands specific to each web server, collected by the agent, as discussed above, may be used to determine the running state of the web server and whether the web server is active or not.

Once evaluation is complete, a discovery result may be generated and stored, as indicated at 404 to URI discovery result store 212. In some embodiments, discovery result store 212 may be a non-relational data store, such as a document database, that may allow for discovery results 430 of different numbers of URI(s) 437 to be stored. A discovery result 430 may include various information, such as a result identifier 431 (e.g., a data store generated identifier to identify the discovery result), server identifier 432 (e.g., an identifier for the web server for the discovery result 430), a creation time 433 (e.g., a timestamp for when the discovery result 412 is first created), a modification time 434 (e.g., a timestamp for when the discovery result 412 is last updated), an organization identifier 435 (e.g., an entity, account, or other identifier for a collection of one or more web servers associated together, such as for collective reporting or analysis), collection time 436 (e.g., a timestamp that indicates when the data was collected) and discovered URI(s) 437 (e.g., a list with respective sets of fields or attributes for each URI). Different URI(s) 437 may include different respective information, such as status 441 (an indication of whether the URI is active, not active, or unknown on the web server), host 442 (e.g., can be a domain or a network address), port 443 (e.g., a port for the URI), server type 444 (e.g., the server product name), SSL setting 445 (e.g., indicating whether or not SSL is enabled), path 446 (e.g., a path component of the URI), protocol 447 (e.g., the protocol used for the URI, such as "https"), URL 448 (e.g., the URL for the URI), and server vendor 449 (e.g., the vendor of the web server hosting the URI).

As discussed above with regard to FIG. 2, machine monitoring service 230 may implement a URI query interface 258 in order to provide access to URI discovery results. FIG. 5 is a block diagram illustrating a query interface for a URI discovery result store, according to some embodiments. As illustrated in FIG. 5, a query 510 may be received using a query language (e.g., SQL or GraphQL), API (e.g., get discovery result), or other type of request. Query 510 may include one (or more) identifiers in order to obtain one (or more) discovery results. For example, an organization identifier and server identifier may be used to distinguish which account and which asset of the organization (e.g., which web server) to obtain discovery results for. In some embodiments, different filter(s) may be included, which may exclude discovery results (or portions of discovery results). For example, filters may include filtering URIs according to status (e.g., active, not active, or unknown), filtering URIs by SSL status (e.g., enabled or disabled), or filtering discovery results by the presence (or absence) of any URIs found on a web server.

In some embodiments, query 510 may be specified using GraphQL. Below is an example of query 510 using GraphQL:

```
query MyQuery {
  server (serverId: "05774e9292a71e8fbc9c7134d8ec48d0",
       orgId: "63408c42-090f-41bd-84f5-dbf5fdc8b17e") {
    data {
      collected {
        discoveredUris {
          uriList {
            domain
            port
            ssl
            url
          }
          lastConfigUpload
          lastUpdated
        }
      }
    }
  }
}
```

Query result 520 illustrates an example of various information that may be included in a query result. For example, the one (or more) URIs discovered (or none if none are discovered), host, port(s), SSL settings, and URLs. In some embodiments, metadata or further information about the results, such as the creation time, modification time, or collection time may be included in a result.

Figure 6:
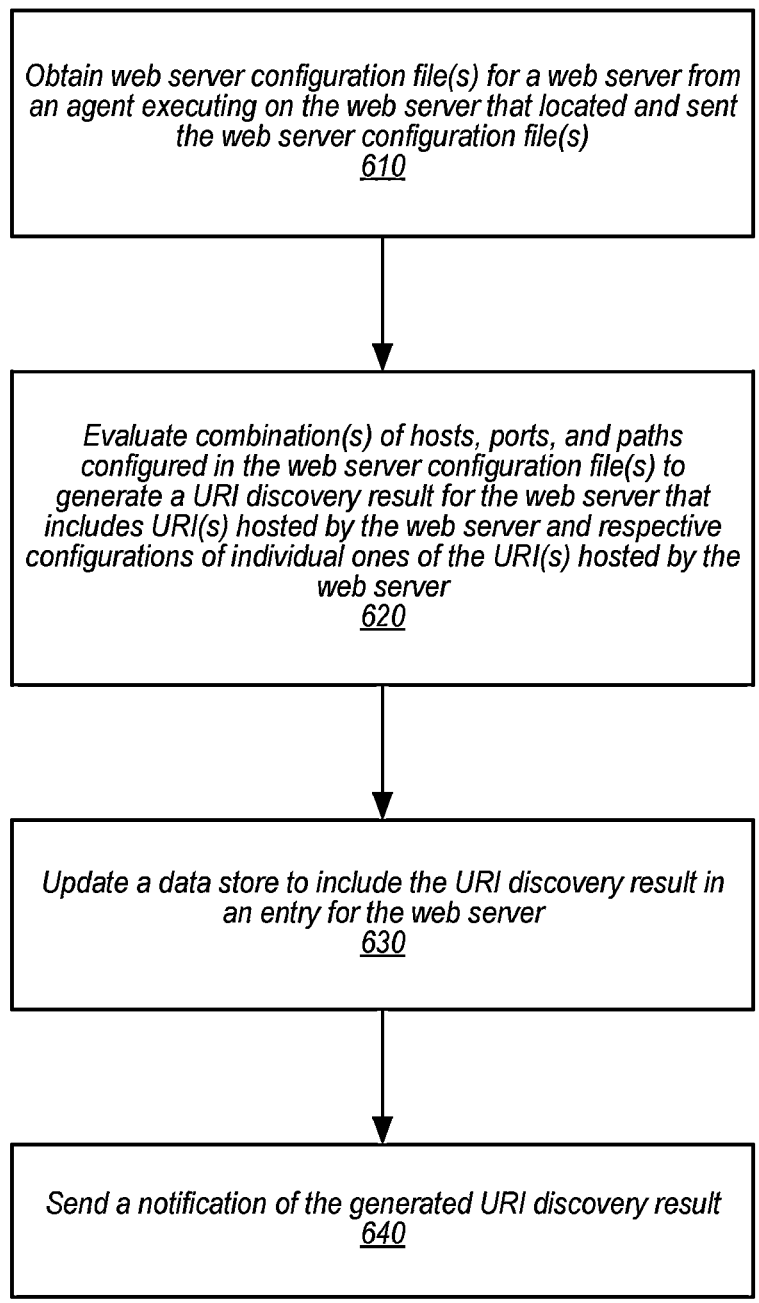
FIG. 6 is a flowchart illustrating a method that evaluates configuration files for URI discovery, according to some embodiments., according to some embodiments.

The examples of a URI discovery system that evaluates configuration files for URI discovery as discussed in FIGS. 2-5 above have been given in regard to a machine monitoring service. However, various other types of systems, services, or applications can advantageously implement evaluating configuration files for URI discovery, in other embodiments. FIG. 6 is a flowchart illustrating a method that evaluates configuration files for URI discovery, according to some embodiments. These techniques, as well as the techniques discussed below with regard to FIG. 7, may be implemented using components or systems as described above with regard to FIGS. 2-5, as well as other types of systems, and thus the following discussion is not intended to be limiting as to the other types of systems that may implement the described techniques.

As indicated at 610, one or more web server configuration file(s) for a web server may be obtained from an agent executing on the web server that located and sent the web server configuration file(s), in some embodiments. For example, an agent may be a collection agent, as discussed above with regard to FIGS. 1, 2, and 3, which may have access to a file system and other host system information for a web server. In addition to locating and sending configuration files, the agent may send the results of different commands executed on the host system to a URI discovery system. In some embodiments, the agent may send the configuration files and other information (e.g., metadata) in response to a request for the information from the URI discovery system, or, in other embodiments, send the information to the URI discovery system automatically.

As indicated at 620, one or more combinations of hosts, ports, and paths configured in the web server configuration file(s) may be evaluated to generate a URI discovery result for the web server that includes URI(s) hosted by the web server and metadata describing a configuration of individual ones of the URI(s) hosted by the web server, in some embodiments. In some scenarios, a single combination of host, port, and path may be specified in the configuration file(s). In some embodiments, multiple possible combinations of host, ports, and paths may be evaluated.

Different techniques for identifying and evaluating the one or more combination of hosts, ports, and paths may be performed, some of which may be dependent upon the type of web server (e.g., product) being evaluated or number of configuration files being evaluated (e.g., one or multiple). For example, some web servers may include multiple URIs, which may be designated as "sites" or "virtual hosts" according to a respective web server type in addition to a base configuration for the web server. In such an example, evaluation techniques may include operations to determine listening addresses/ports and paths specific to any virtual host/site. If the address uses a wildcard * or _default, it will serve all requests for that port, otherwise it may only be responsible for requests to a certain address and the base configuration handles the rest. For both the base configuration and every virtual host/site, the path/port combinations may be determined that a web server is responsible for. For values not specified in a virtual host/site, base configuration values may be evaluated.

As indicated at 630, a data store may be updated to include the URI discovery result in an entry for the web server, in some embodiments. For example, as discussed above with regard to FIG. 4, a data model that includes various information as part of the URI discovery result may be supported or maintained at the data store (e.g., using a non-relational database or other data store that does not strictly enforce a schema), including, but not limited to, a result identifier, server identifier, a creation time, a modification time, an organization identifier, account, or other identifier for a collection of one or more web servers associated together, collection time and discovered URI(s). For each of the discovered URI(s), different respective information, such as URI status, host, port, server type, SSL setting, path, protocol, URL, and server vendor may be included.

As indicated at 640, a notification of the generated URI discovery result may be sent, in some embodiments, while in other embodiments no notification may be sent. The notification may be sent to registered recipients using various communication protocols or techniques. The notification may include, in some embodiments, information to lookup the generated discovery result using one or more identifiers (e.g., using a query as discussed below with regard to FIG. 7 and above with regard to FIG. 5). In some embodiments, the discovery result itself may be included in the notification (or a subset of the discovery result information).

The data store that stores the discovery results for different web servers may be used to handle different queries for discovery results. FIG. 7 is a flowchart illustrating a method for querying for URI discovery results, according to some embodiments. As indicated at 710, a query for a discovery result for a web server may be received, in various embodiments. As discussed above with regard to FIG. 5, such a query may be specified in a query language (e.g., SQL or GraphQL), API (e.g., get discovery result), or other type of request (e.g., a graphical user interface with drop down boxes, text entry, or other user interface elements).

As indicated at 720, an entry for the web server in a result store may be accessed to obtain the discovery result. For example, the query may include one (or more) identifiers used as a lookup key or other index value. For example, an organization identifier and server identifier may be used to distinguish which account and which asset of the organization (e.g., which web server) to obtain discovery results for, accessing an appropriate table or document collection, and a specific data item or document for the web server in the table or document collection.

As indicated at 730, a determination may be made as to whether filter(s) are included in the query. Filters may be specified as conditions, predicates, or other features of the query (e.g., specified according to the query language or API parameters). In some embodiments, different filter(s) may be included, which may exclude discovery results (or portions of discovery results). For example, filters may include filtering URIs according to status (e.g., active, not active, or unknown), filtering URIs by SSL status (e.g., enabled or disabled), or filtering discovery results by the presence (or absence) of any URIs found on a web server. If filter(s) are to be applied to the discovery result, as indicated by the positive exit from 730, then the initial discovery results obtained from the result store may be modified to conform to the filter(s) (e.g., where excluded results (or portions thereof) are removed from the entry for the web server).

As indicated at 750, the discovery result may be returned in response to the query, in various embodiments. For example, the query may be returned according to the same interface via which the query was received (e.g., a command line interface or a graphical user interface). In some embodiments, the discovery result may be aggregated with results of other queries (or a single query may include a request for discovery results for multiple web servers).

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may be configured to implement the functionality described herein (e.g., the functionality of various servers and other components that implement a provider network described herein). The various methods as illustrated in the figures and described herein represent example embodiments of methods. The order of any method may be changed, and various elements may be added, reordered, combined, omitted, modified, etc.

Figure 8:
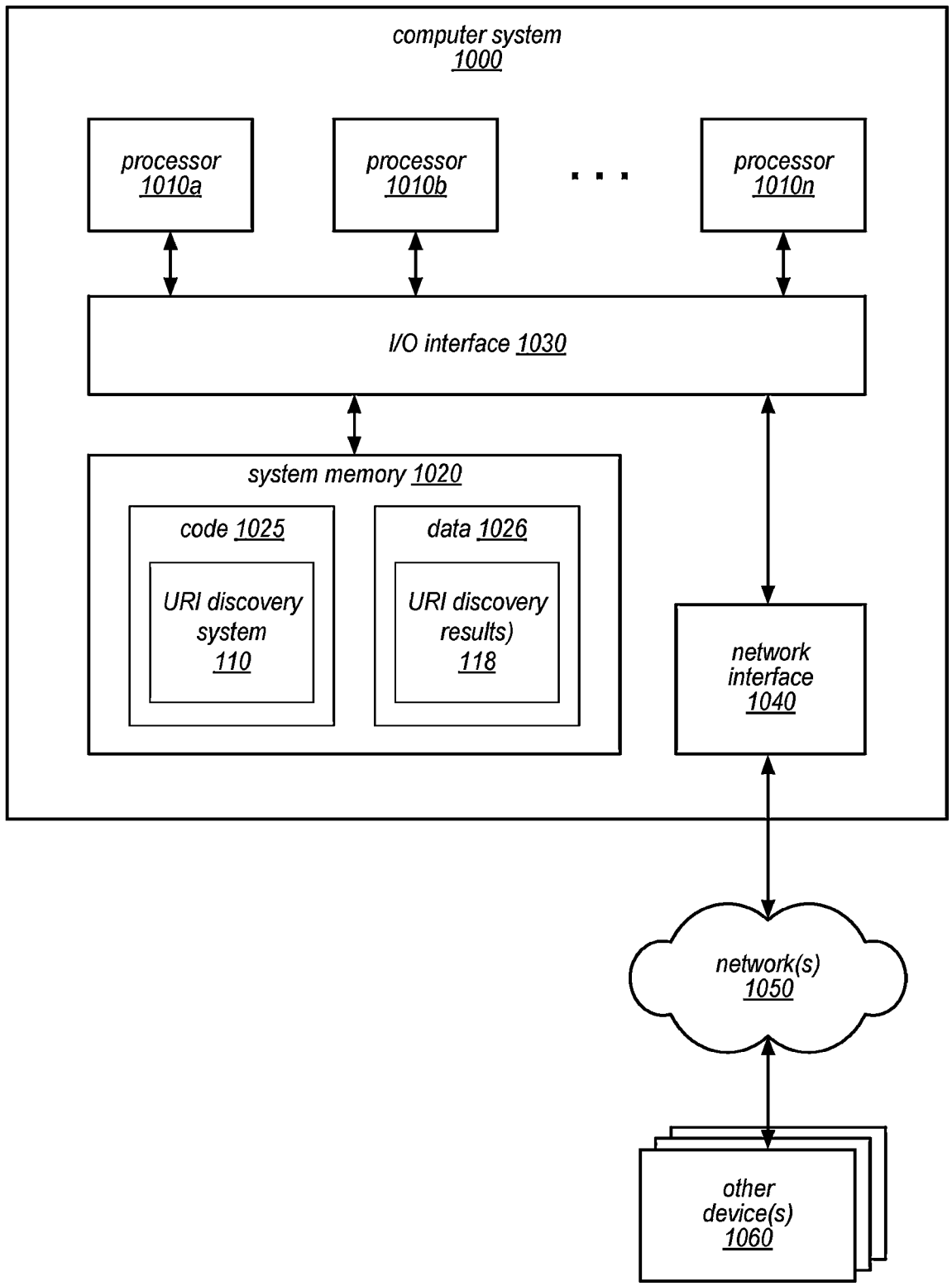
FIG. 8 is a block diagram illustrating an example computer system that can be used to implement one or more portions of a model training system that can be used to train an exploitability risk model, according to some embodiments.

FIG. 8 is a block diagram illustrating an example computer system that can be used to evaluate configuration files for URI discovery, according to some embodiments. For example, the computer system 1000 may be a server that implements one or more components of the URI discovery system 110 of FIG. 1. In some embodiments, the computer system 1000 may be used to implement one or more components of the machine monitoring service 230 of FIG. 2.

Computer system 1000 may be implemented using a variety of computing devices, such as a personal computer system, desktop computer, laptop or notebook computer, mainframe computer system, handheld computer, workstation, network computer, a consumer device, application server, mobile telephone, or some other type of computing device.

As shown, computer system 1000 includes one or more processors 1010, which may include multiple cores coupled to a system memory 1020 via an input/output (I/O) interface 1030. Computer system 1000 further includes a network interface 1040 coupled to I/O interface 1030. In some embodiments, computer system 1000 may be a uniprocessor system including one processor 1010, or a multiprocessor system including several processors 1010*a-n*, as shown. The processors 1010 may be any suitable processors capable of executing instructions. For example, in various embodiments, processors 1010 may implement one of a number of instruction set architectures (ISAs), such as the x86, PowerPC, SPARC, or MIPS ISA.

As shown, the computer system 1000 may also include one or more network communication devices (e.g., network interface 1040) for communicating with other systems and/or components over a communications network. For example, an instance of an application executing on computer system 1000 may use network interface 1040 to communicate with another server application executing on another computer system, as described herein.

As shown, computer system 1000 may use its network interface 1040 to communicate with one or more other devices 1060, such as persistent storage devices and/or one or more I/O devices. In some embodiments, some of these other devices may be implemented locally on the computer system 1000, accessible via the I/O interface 1030. In various embodiments, persistent storage devices may include disk drives, tape drives, solid state memory, other mass storage devices, or any other persistent storage device. The computer system 1000 may store instructions and/or data in persistent storage devices, and retrieve the stored instruction and/or data as needed.

As shown, the computer system 1000 may include one or more system memories 1020 that store instructions and data accessible by processor(s) 1010. In various embodiments, system memories 1020 may be implemented using any suitable memory technology, (e.g., one or more of cache, static random-access memory (SRAM), DRAM, RDRAM, EDO RAM, DDR 10 RAM, synchronous dynamic RAM (SDRAM), EEPROM, non-volatile/Flash-type memory, etc.). The system memory 1020 may be used to store code 1025 or executable instructions to implement the methods and techniques described herein. For example, the executable instructions may include instructions to implement the URI discovery system 110, as discussed. The system memory 1020 may also be used to store data 1026 needed or produced by the executable instructions. For example, the in-memory data 1026 may include portions of URI discovery result(s), as discussed.

In some embodiments, some of the code 1025 or executable instructions may be persistently stored on the computer system 1000 and may have been loaded from external storage media. The persistent storage of the computer system 1000 and the external media are examples of non-transitory computer-readable storage media, which may be used to store program instructions to be executed by the computer system 1000. A non-transitory computer-readable storage medium may provide the capability to store information in a form readable by a machine (e.g., computer system 1000). Non-transitory computer-readable media may include storage media such as magnetic or optical media, disk or DVD/CD-ROM devices, archival tapes, network-attached storage systems, or other computer systems.

In some embodiments, the I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

In some embodiments, the network interface 1040 may allow data to be exchanged between computer system 1000 and other devices attached to a network. The network interface 1040 may also allow communication between computer system 1000 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems 1000. Multiple input/output devices may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1050. Network interface 1040 may commonly support one or more wireless networking protocols (e.g., Wi-Fi/IEEE 802.11, or another wireless networking standard). In some embodiments, the network interface 1040 may support communication via telecommunications/telephony networks such as analog voice networks or digital fiber communications networks, via storage area networks such as Fibre Channel SANs, or via any other suitable type of network and/or protocol.

Although the embodiments above have been described in considerable detail, numerous variations and modifications may become apparent to those skilled in the art once the disclosed inventive concepts are fully appreciated. It is intended that the following claims be interpreted to embrace all such variations and modifications, and the above description to be regarded in an illustrative rather than a restrictive sense.

What is claimed is:

1. A system, comprising:
   one or more hardware processors with associated memory that implement a machine monitoring service and an exploitation testing service, configured to:
   collect, over a public network, machine characteristics data from a plurality of private networks, wherein the private networks are associated with a plurality of different organizations, companies, or entities;
   discover, among a plurality of machines of a network and based on machine characteristics data collected from the machines, a plurality of web servers executing on the machines;
   store respective entries for Uniform Resource Identifiers (URIs) exposed by the web servers in a data store;
   generate a discovery notification indicating one or more newly discovered URIs exposed by web servers in the network;
   receive, from an exploitation testing service and in response to the discovery notification, a query for information about the one or more newly discovered URIs exposed by the web servers in network; and
   execute the query on the data store and return to the exploitation testing service the information responsive to the query, wherein the exploitation testing service is configured to perform automated exploitation testing on the network on an event-driven basis in response to the information about the one or more newly discovered URIs wherein the automated exploitation testing includes (a) determining configuration information and a vulnerability of a newly discovered URI indicated by the information returned by the query and (b) simulating one or more cyberattacks on the newly discovered URI using the configuration information to exploit the vulnerability.

2. The system of claim 1, wherein
the machine monitoring service is implemented using virtual computing resources provided by a cloud-based service provider network, and
the machine characteristics data are sent to the machine monitoring service by one or more data collection agents or one or more data collection appliances located in the network.

3. The system of claim 1, wherein the data store is a non-relational data store or a document database.

4. The system of claim 1, wherein
the machine monitoring service generates an entry for a URI based on a configuration file associated with a web server, wherein the configuration file indicates a hostname, a port, and a path associated with the URI.

5. The system of claim 4, wherein the entry indicates the hostname, the port, and the path, and one or more of:
an entity or account identifier associated with the URI,
an active or inactive status of the URI,
a server type of the web server,
a Secure Socket Layer (SSL) status of the URI,
a protocol used for the URI, and
a Uniform Resource Location (URL) associated with the URI.

6. The system of claim 5, wherein the entry indicates one or more of:
a creation time of the entry,
a modification time of the entry, and
a data collection time associated with the entry.

7. The system of claim 4, wherein
the configuration file is evaluated by an agent executing on a machine where the web server executes, wherein the agent is configured to send results of the evaluation to the machine monitoring service.

8. The system of claim 1, wherein
the exploitation testing service is implemented using a penetration testing framework that provides testing modules for different types of cyberattacks.

9. The system of claim 1, wherein
the exploitation testing service is configured to perform network scan of the network based on the entries of URIs stored in the data store.

10. The system of claim 1, wherein
to execute the query, the machine monitoring service is configured to filter entries in the data store according to one or more filtering parameters specified by the query.

11. A method, comprising:
performing, by a machine monitoring service and an exploitation testing service implemented by one or more hardware processors with associated memory:
collecting, over a public network, machine characteristics data from a plurality of private networks, wherein the private networks are associated with a plurality of different organizations, companies, or entities;
discovering, among a plurality of machines of a network and based on machine characteristics data collected from the machines, a plurality of web servers executing on the machines;
storing respective entries for Uniform Resource Identifiers (URIs) exposed by the web servers in a data store;
generating a discovery notification indicating one or more newly discovered URIs exposed by web servers in the network;
receiving, from an exploitation testing service and in response to the discovery notification, a query for information about the one or more newly discovered URIs exposed by the web servers in network; and
executing the query on the data store and returning to the exploitation testing service the information responsive to the query,
wherein the exploitation testing service is configured to perform automated exploitation testing on the network on an event-driven basis in response to the information about the one or more newly discovered URIs, wherein the automated exploitation testing includes (a) determining configuration information and a vulnerability of a newly discovered URI indicated by the information returned by the query and (b) simulating one or more cyberattacks on the newly discovered URI using the configuration information to exploit the vulnerability.

12. The method of claim 11, further comprising:
the machine monitoring service selecting different workflows to generate entries for URIs exposed by different web server types.

13. The method of claim 11, further comprising:
the machine monitoring service generating an entry for a URI based on a configuration file associated with a web server, wherein the configuration file indicates a hostname, a port, and a path associated with the URI.

14. The method of claim 13, wherein
the URI is an unlinked URI that is not linked to any known URIs exposed by the web server and cannot be discovered by a spidering technique.

15. The method of claim 13, wherein the entry indicates the hostname, the port, and the path, and one or more of:
an entity or account identifier associated with the URI,
an active or inactive status of the URI,
a server type of the web server,
a Secure Socket Layer (SSL) status of the URI,
a protocol used for the URI, and
a Uniform Resource Location (URL) associated with the URI.

16. The method of claim 11, wherein
the exploitation testing service is implemented using a penetration testing framework that provides testing modules for different types of cyberattacks.

17. The method of claim 11, wherein
the one or more cyberattacks include one or more network scans of the network based on the entries of URIs stored in the data store.

18. The method of claim 11, wherein
executing the query includes filtering entries in the data store according to one or more filtering parameters specified by the query.

19. The method of claim 11, further comprising:
the machine monitoring service receiving a second query directed to the data store via a graphical user interface of the machine monitoring service.

20. The method of claim 11, wherein
the machine monitoring service is implemented using virtual computing resources provided by a cloud-based service provider network, and
the machine characteristics data are sent to the machine monitoring service by one or more data collection agents or one or more data collection appliances located in the network.

\* \* \* \* \*